United States Patent [19]
Werth

[11] 3,812,747
[45] May 28, 1974

[54] TOOL ARM STRUCTURE

[76] Inventor: Carl H. Werth, 818 Thurman St., Saginaw, Mich. 48602

[22] Filed: June 12, 1972

[21] Appl. No.: 261,939

Related U.S. Application Data

[62] Division of Ser. No. 59,443, July 30, 1970, Pat. No. 3,707,101.

[52] U.S. Cl.................. 82/36 R, 408/714, 408/173
[51] Int. Cl..................... B23b 29/034, B23b 29/12
[58] Field of Search......... 408/2, 13, 173, 153, 714; 82/36 R, 5, 1 R, DIG. 9, 24 R; 51/165.89

[56] References Cited
UNITED STATES PATENTS
3,361,018   1/1968   Druckman .......................... 82/36 X Primary Examiner—Francis S. Husar
Attorney, Agent, or Firm—Learman & McCulloch

[57] ABSTRACT

A tool arm structure comprising a movable or yieldable, tool mounting portion, adjustable control mechanism for adjusting the machining position of the tool mounting portion, and mechanism for separating the adjusting mechanism and tool mounting portion when the control mechanism is being adjusted.

10 Claims, 22 Drawing Figures

TOOL ARM STRUCTURE

The present application is a division of application Ser. No. 59,443, now U.S. Pat. No. 3,707,101, granted Dec. 26, 1972.

This invention relates to a system for machining ring-shaped workpieces, and more particularly to tool arm structure for machining a workpiece at a work station and apparatus for automatically adjusting the tool arm structure when the workpieces are not machined within predetermined tolerances. In machining workpieces according to the system to be described, apparatus is provided to deliver the workpieces to a work station and to subsequently remove the workpieces after they have been machined. To automatize the delivery and discharge system, it has been found desirable to provide separate loading and unloading apparatus which is mounted for simultaneous movement so that as a machined workpiece is being removed from the work station, another unmachined workpiece is immediately being delivered thereto. As the machining tool wears with the machining of workpieces, the diameters of the newly machined bores will not be properly precisely machined and thus, apparatus is provided in the present system for gauging or measuring the diameter of the bores of the machined workpieces and for automatically adjusting the position of the boring tool.

Apparatus for adjustably mounting a boring tool is disclosed in U.S. Pat. No. 3,190,152 granted June 22, 1965 to Carl H. Werth.

It is an object of the present invention to provide apparatus for automatically controlling the radial position of the boring tool to compensate for wear of the boring tool.

Briefly, in accordance with the present invention, there is provided a tool arm structure including a movable tool support mechanism for moving said tool support mechanism and apparatus for separating the mechanism during adjustment.

Other objects and advantages of the present invention will become apparent to those of ordinary skill in the art by the following description when considered in relation to the accompanying drawings in which:

THE GENERAL SYSTEM

Figures 1, 1A, 1C, 12A, 12B, 12C, 12D:
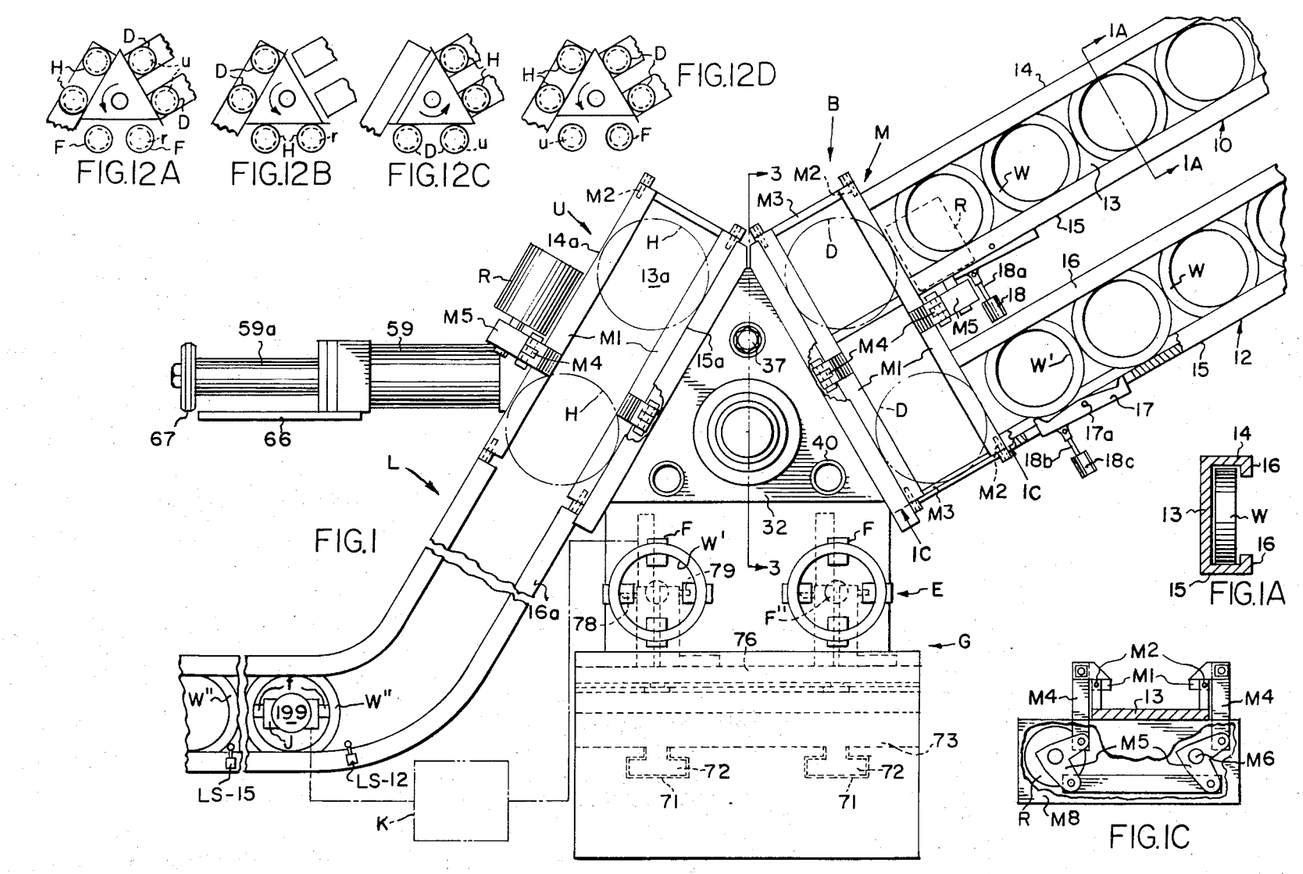
FIG. 1 is a partly schematic front elevational view showing the various components of the machining system, parts being broken away to more clearly illustrate some of the mechanism.
FIG. 1A is a transverse, sectional view taken along the line 1A—1A of FIG. 1 and illustrating a typical workpiece positioned in one of the workpiece supply chutes.
FIG. 1C is a transverse, sectional view taken along the line 1C — 1C of FIG. 1 and illustrating the mirror image of the workpiece retaining hinge bars for the supply and discharge chutes.
FIGS. 12A - 12D are schematic representations of the various positions which the indexible apparatus illustrated in FIGS. 1 - 4 assumes during a complete machining cycle.
Figures 2, 2A, 2B:
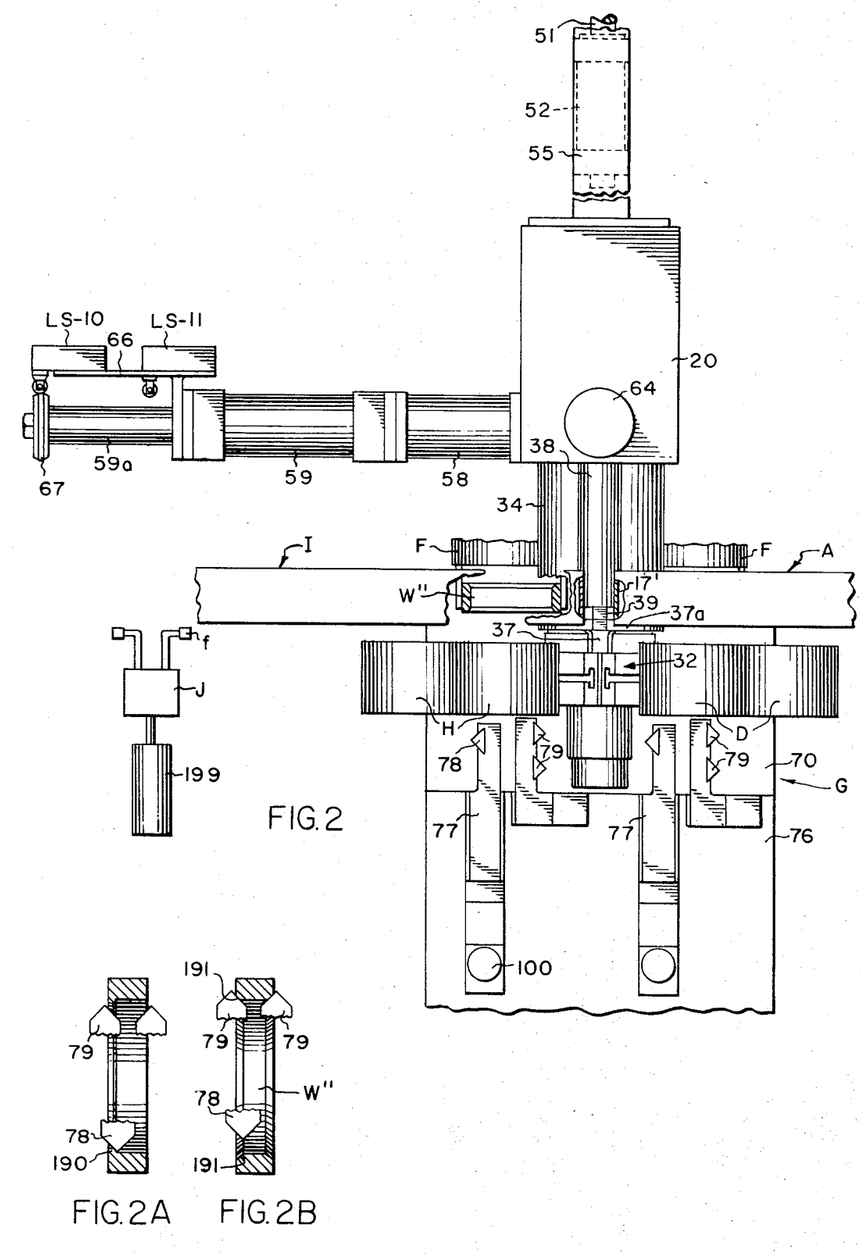
FIG. 2 is a top plan view of the assembly illustrated in FIG. 1, parts being broken away to more clearly illustrate certain portions thereof and certain components being omitted in the interest of clarity.
FIGS. 2A and 2B are horizontal sectional views through a partly machined workpiece illustrating the machining cuts which are progressively made on a workpiece.

Referring now more particularly to the drawings and in the first instance to FIGS. 1 and 2, a pair of vertically inclined superposed supply chutes constitute a chute assembly A which is provided for supplying workpieces W to a load station B. An indexible machine tool loading and unloading carrier, generally illustrated at C, mounts pairs of chucks, schematically shown at D and H, for transferring pairs of workpieces W from the load station B to a work or machining station E where they are supplied to a pair of stationary workpiece holding chucks F which secure the workpieces for subsequent machining and for transferring them subsequently to a discharge chute I. Machining apparatus indicated generally at G, is provided, in this embodiment of the invention, for boring and chamfering the opening W' of the pair of workpieces W at the machining station E. Gauging apparatus, generally designated J, is provided for measuring the newly machined bores W" and control apparatus K is connected with, and is responsive to, the measuring apparatus J for controlling the position of the boring tool on the machining mechanism G.

The indexible chucks D and H and the stationary chucks F at machining station E, may suitably be diaphragm type chucks such as that disclosed in U.S. Pat. No. 3,087,737 granted Apr. 30, 1963 to Carl H. Werth. The measuring head J may be of the type manufactured by Marposs Gauge Manufacturing, of Manchester, Michigan, a division of Brown & Sharpe, Inc., under Model No. BEY7, which incorporates an amplifier such as model No. LAK-4, also manufactured by Marposs Gauge Manufacturing, Inc. The stationary chucks F are mounted for rotational movement on shafts F'' which are driven by any suitable sources of power such as electric motors (not shown).

THE SUPPLY AND DISCHARGE CHUTES

The vertically inclined, supply chute assembly A is made up of a pair of upper and lower chutes, indicated generally at 10 and 12 and a transversely extending gate mechanism, generally illustrated at M, at the terminal portions of the chutes 10 and 12. The chutes 10 and 12 each include a back wall 13, top and bottom walls 14 and 15 respectively (FIG. 1A), and partial front walls 16 extending downwardly and upwardly from the side walls 14 and 15. The gate mechanism M includes a pair of hinge bars M1 pivotally mounted on pivot pins M2 mounted on upper and lower support walls M3. Each of a pair of links M4 is pivotally connected with one of the hinge bars M1 and one of a pair of bell cranks M5 fixed to a shaft M6 journaled in a wall M8 of the frame. One of the shafts is driven by a reversible "ROTAC" electric motor R suitably mounted on the wall M8. The motor R is operated in a manner to be described to open the hinge bars M1 by swinging them about the pivot pins M2 to provide clearance openings through which the pair of chucks D may pass to grip and remove the unmachined workpieces from the supply chutes 10 and 12.

To control the passage of the workpieces W along the chutes 10 and 12, each chute includes a stop member 17 pivotally mounted on a pin 17a passing through the lowermost wall 16 and the back wall 13 of the chute. The stops 17 in the chutes 10 and 12 are respectively connected with the pistons 18a and 18b of double acting, solenoid operated pneumatic or hydraulic cylinders 18 and 18c which operate to pivot the stop members 17 about the pins 17a to successively permit one workpiece W in each chute 10 and 12 to pass simultaneously toward the loading station B while interrupting the movement of the remaining workpieces W along the chutes 10 and 12. As shown in FIG. 2, an end wall 17b is provided to stop the rolling workpieces W at the loading station B.

The discharge chute I includes lower and upper chute portions L and U having a back wall 13a and top and bottom walls 14a and 15a. The lower portion L also includes front wall portions 16a. The upper chute portion includes a gate mechanism M' which is identical to the gate mechanism M associated with the supply chute assembly A. Corresponding parts are designated with like numerals. The chute I is curved at its lower end where the workpieces pass horizontally to the gauging station.

INDEXIBLE MACHINE TOOL LOADING & UNLOADING APPARATUS

Figure 3:
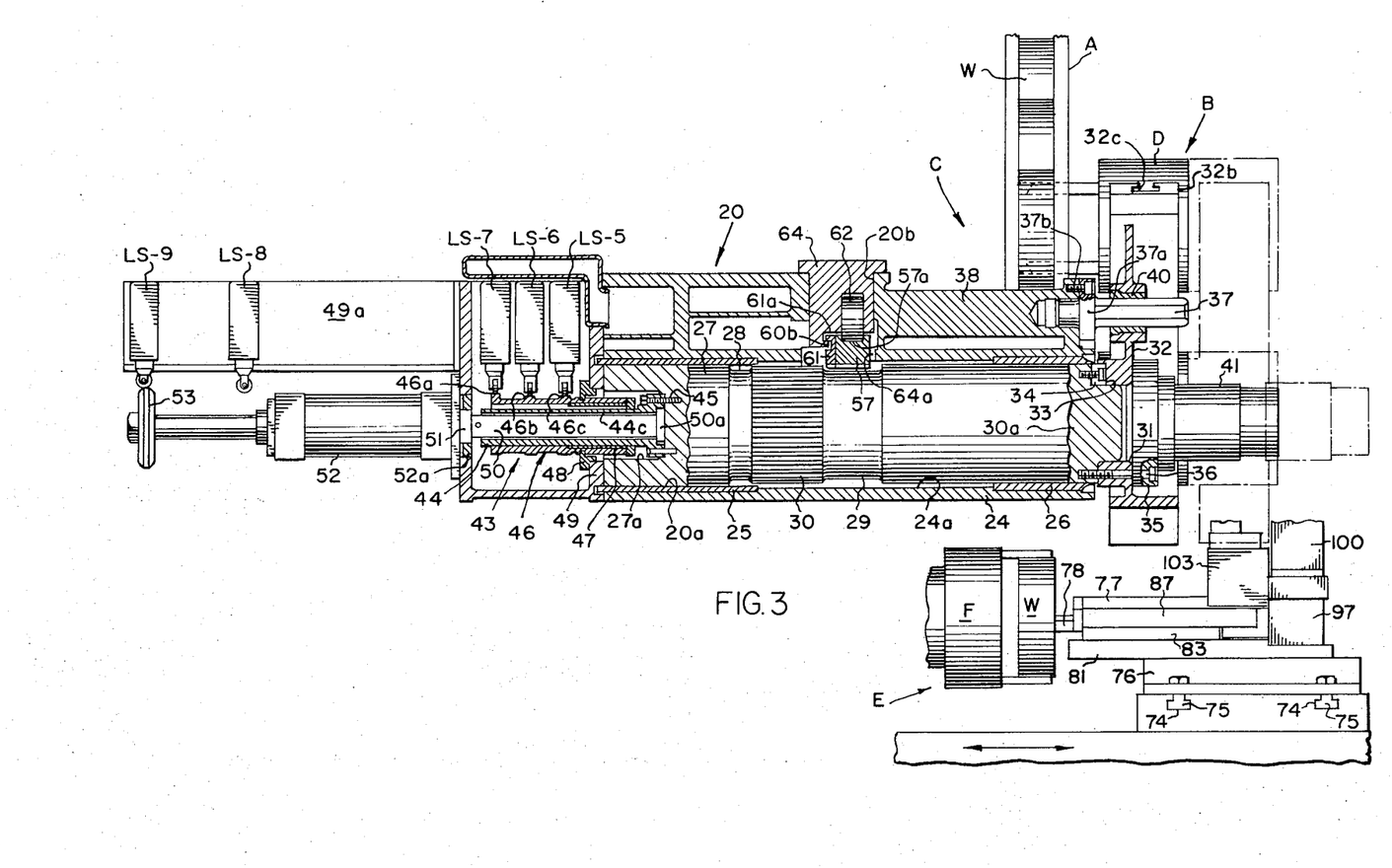
FIG. 3 is a fragmentary, side elevational, sectional view taken along the line 3 — 3 of FIG. 1, certain parts thereof being shown in phantom lines in an axially adjusted position.
Figure 4:
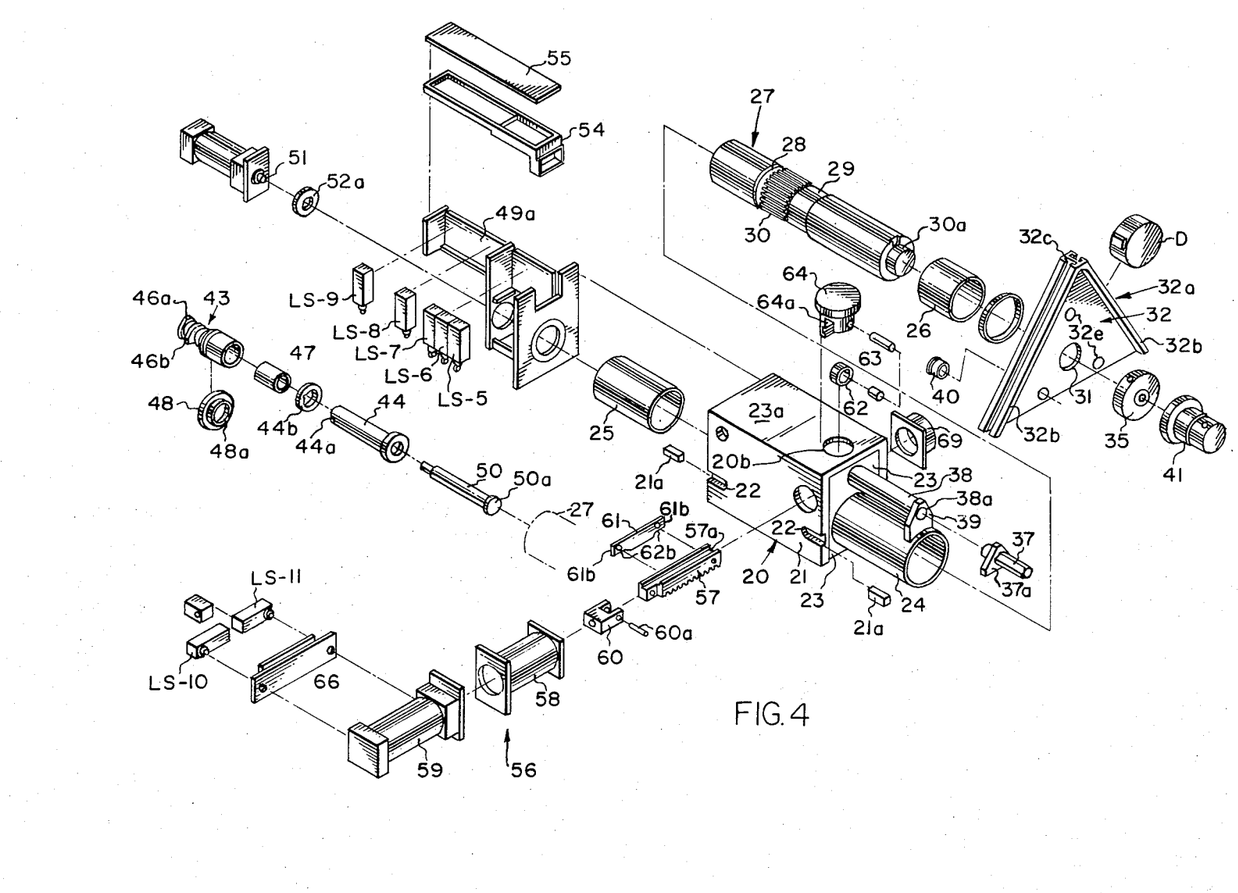
FIG. 4 is an exploded perspective view, slightly reduced in size, illustrating the various component parts which make up the indexible carrier assembly for transferring work-pieces between the various stations.

Referring now more particularly to FIGS. 3 and 4, the indexible machine tool loading and unloading carrier assembly C comprises a main shaft housing, generally designated 20, having side walls 21, end walls 23, and top and bottom walls 23a. The side walls 21 mount the housing 20 on suitable support structure and are formed with slots 22 to receive keys 21a also received by the support frame structure (not shown). Integrally formed with one of the end walls 23 is a tubular member 24 formed with a cylindrical passage 24a therein in communication with a bore 20a (FIG. 3) extending through the main shaft housing 20. A pair of bushings 25, 26 are received within the bores 20a, 24a respectively and collectively journal a main shaft generally designated 27 which has pinion gear teeth 30 cut into the mid-portion thereof and diametrically reduced portions 28 and 29 formed on opposite sides of the pinion gear portion 30, these portions 28 and 29 being reduced to below the root diameter of the pinion gear teeth 30.

The front end of the main shaft 27 is provided with a reduced stub shaft portion 30a, on which is received a chuck mounting plate 32 having a bore 31 and a keyway 33 is provided for receiving a key 34 (FIG. 3) which keys the shaft 27 to the mounting plate 32. The loader mounting plate 32 comprises a traingularly shaped 32a having flanges 32b extending along two sides thereof which are formed with T-shaped slots 32c therein for receiving complementally formed T-shaped mounting brackets (not shown) for supporting the pairs of chucks D and H. The mounting plate 32a also includes three equiangularly spaced apart apertures 32e for consecutively receiving a guide pin 37 provided on housing assembly 20. The pin 37 is stationarily mounted within a partial bore 38a formed in a cylindrical member 38 extending between the end plate 23a and a bracket 39 which is fixed to the tubular portion 24. The guide pin 37 includes a mounting bracket portion 37a which may be suitably secured to the portion 39 with bolts 37b (FIG. 3). A bushing 40 is received within each of the recesses 32e for sequentially receiving the pin 37 as the carrier plate 32 is rotated in a manner to be later described. A mount plate 35 is provided to fit on the stub shaft portion 30 and a plurality of bolts 36 connect the plate 35, the carrier plate 32, and the main shaft 27 rigidly together. Bolted or otherwise suitably secured to the plate 35 is an air supply joint assembly 41 which includes the usual freely rotating connector which may be utilized to couple a pneumatic source (not shown) with suitable conduits (not shown) connected with the air operated chucks D and H.

The main shaft 27, at its other end, has a partial bore 27a (FIG. 3) for receiving a switch controlling camming mechanism, generally indicated 43, which includes a tubular shaft 44 rigidly connected to the main shaft 27 at its front end by a plurality of bolts 45. The shaft 44 includes a splined portion 44a for receiving a complementally splined drive ring 44b which is bolted or otherwise suitably secured to a drum cam 46 having three axially spaced lobes 46a, 46b, and 46c which are circumferentially displaced at 120° intervals. A bushing 47 is received within the bore 46d of the drum cam 46 and a retaining collar 48, having a bore 48a which rotatably receives the drum cam 46, is bolted or otherwise suitably secured to a wall, generally shown at 49, which in turn is bolted or otherwise suitably secured to the main housing 20. A cylindrical draw bar 50, having an enlarged head 50a, is rotatably received within the bore 44c in the shaft 44 and is secured to the piston 51 of a double acting solenoid actuated hydraulic cylinder 52 which is mounted on the housing 20. The piston 51 and draw bar 50 move the shaft 27 axially relative to the drum cam 46 and, of course, when the shaft 27 is rotated, the shaft 44 is driven to rotate the drum cam 46. A slide bushing 52a for the piston rod 51 is secured to the housing 20 in any suitable manner.

A plurality of limit switches LS-5, LS-6, and LS-7 are mounted on the housing 20 opposite cam lobes 46a –

46c and a pair of limit switches LS-8 and LS-9 depend from housing bracket 49a in position to be engaged by an actuator member 53 connected with the opposite rear end of the piston 51 for a purpose to be later described. An electrical wire housing assembly 54, with a cover 55, is provided for encasing the electrical wiring harnesses, which provide the necessary electrical connections to the limit switches LS-5 through LS-9 and the appropriate solenoids for the double acting cylinder 52. When the solenoid 52a (FIG. 11), of the cylinder 52 is actuated, the piston 51 moves the shaft 27 and the carrier plate 32 carrying the chucks D and H thereon from the full line position shown in FIG. 3, where the chucks D and H are adjacent the load and discharge stations B and I, to the removed chain line position, shown in FIG. 3, so that the plate 32 and chucks D and H subsequently may be indexed in a manner to be presently described.

The apparatus for relvolving the carrier plate 32 with the chucks D and H thereon is shown generally at 56 in FIGS. 2 and 4 and includes a rack 57 received within a housing 58 and connected to the piston of a rack actuating cylinder 59 via a clevis coupling 60 and a connecting pin 60a. The clevis 60 has a threaded bore receiving the threaded end of the piston rod extending from the double acting, solenoid actuated hydraulic cylinder 59 which is supported on housing 20. Bolted or otherwise suitably secured to one side of the rack 57 for a purpose to be later described, is a safety plate 61. The rack 57 is slotted on its upper surface at 57a for receiving a guide roller 62 (FIG. 3) which is journaled on a pin 63 mounted by a clevised plug 64 which has a slot 64a for receiving roller 62. The plug 64 is mounted in an aperture 20b formed in the top wall 23a of the main housing 20. The plug 64 also includes a diametrically extending slot 60b communicating with the slot 64a for slidably receiving a flange 61a on rack plate 61. At its ends, the safety plate 61 (see FIG. 4) includes reduced end portions 61b formed by cylindrically shaped recesses 62b which, in a manner which will be described, permits the pinion 30 to slide axially relative to the rack 57 when the rack 57 is in its innermost or outermost position. Conversely, plate 61 engages the pinion gear 30 and prevents the rack 57 from reciprocating, when the carrier plate 32 is not in its axially extreme position.

A mounting bracket 66, connected with the cylinder 59, mounts a pair of limit switches LS-10 and LS-11 (FIGS. 2 and 4) in position to be engaged by an actuator member 67 connected with the piston rod 59a of the cylinder 59, when the cylinder is respectively actuated to advance and retract the rack 57. When the main shaft 27 is in the axially inner, full line position shown in FIG. 3, the rack 57 and safety plate 61 are both received within the slotted portion 29 of shaft 27 whereas when the shaft 27 is moved to the outer, chain line position in FIG. 3, the rack 57 will drivingly engage the pinion portion 30 of the shaft 27 and the plate 61 is aligned with and passes through the annular slot 28. A rack receiving housing member 69 is also secured to the opposite side of the main housing 20 for receiving the end of the rack 57 as it moves forwardly. It should be noted that the rack 57 will engage the pinion 30 to rotate the shaft 27 and the indexible carrier plate 32 on only the rearward sroke of the rack 57, or from right to left as viewed in FIG. 2. It should be understood, of course, that the piston 59 could optionally be mounted on the opposite side of the pinion 30 if desired, in which case the rack would engage the pinion 30 on the forward stroke in order to rotate the carrier plate 32 in the same direction.

THE TOOL ARM

Figures 10, 10A:
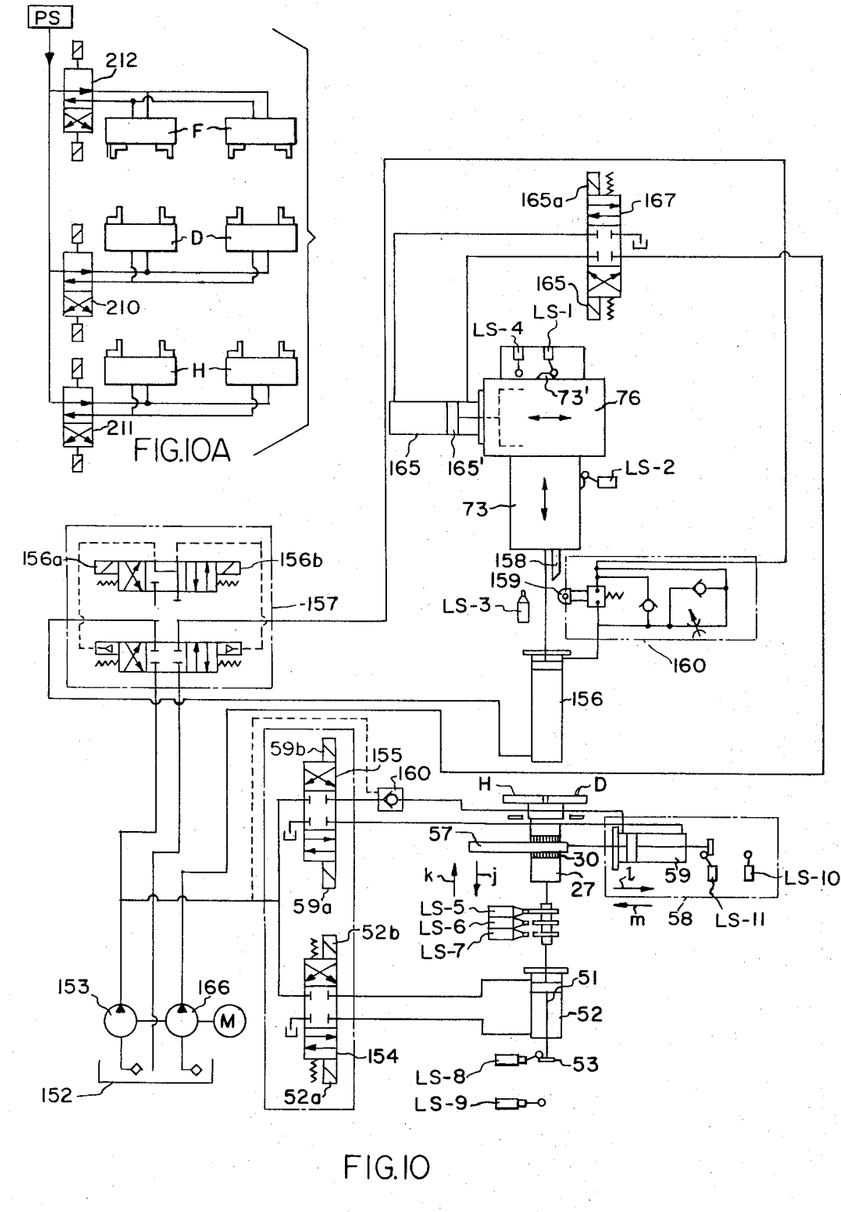
FIG. 10 is a fragmentary, schematic diagram of the hydraulic control system used to control the apparatus illustrated in FIGS. 1 - 9.
FIG. 10A is a schematic diagram of a typical pneumatic control system for controlling the stationary and indexible chucks.

The machining apparatus G for machining the workpieces W at the work stations E includes a stationary base assembly 70 (FIG. 1) including a pair of T-shaped ways 71 for receiving complementally formed T-shaped guides 72 secured to the underside of a main slide or carriage 73, which is reciprocated axially relative to the workpieces in timed relation with the rotation of the indexing carrier apparatus C by a double acting, solenoid operated hydraulic cylinder 156 (FIG. 10). The main slide carriage 73 also includes transversely disposed T-shaped ways 74 (FIG. 3) receiving complementally formed T-shaped guides 75 for guiding a movable cross slide or table 76. The cross slide 76 is crosswisely moved by a double acting, solenoid operated, hydraulic cylinder 165 (FIG. 10).

The cross slide or table 76 mounts a pair of tool arms, indicated generally at 80, each of which mounts a boring tool 78 on a tool holder member 77. The carriage 76 also fixedly mounts, on a bracket 79a, a straddle face chamfering tool 79 which includes a pair of chamfering bits extending in a direction diametrically opposed to the boring tool 78 so as to chamfer the end faces of workpieces W positioned on the machining station chucks E.

Figures 7, 8, 9:
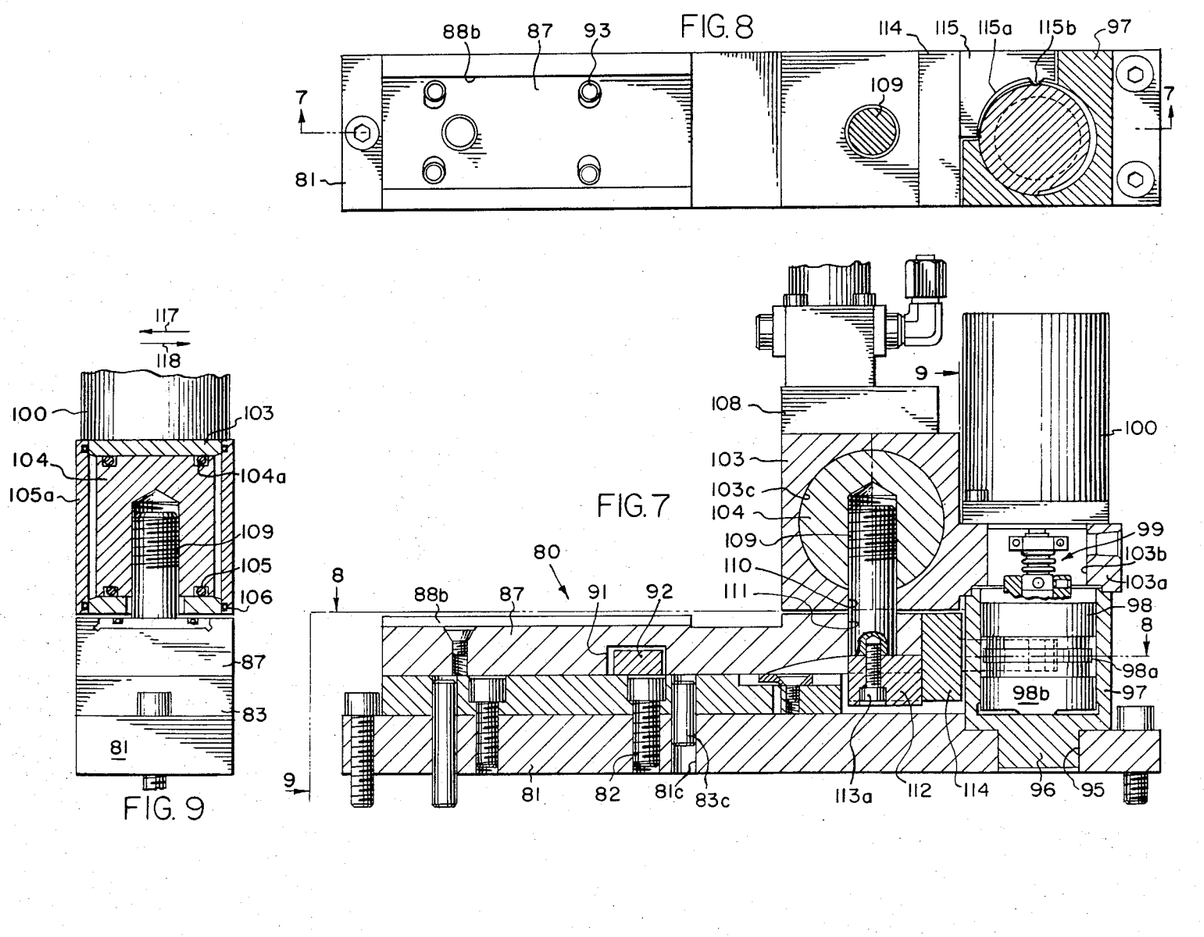
FIG. 7 is a sectional side elevational view of the tool arm taken along the line 7 — 7 of FIG. 8.
FIG. 8 is a top plan view of the tool arm taken along the line 8 — 8 of FIG. 7.
FIG. 9 is a sectional side elevational view of the tool arm taken along the line 9 — 9 of FIG. 7.

As the boring tools 78 wear with use, they are, in the present system, adjusted radially outwardly to compensate for this wear and for this purpose, the controlled tool arms, generally indicated at 80 in FIG. 7, and formed according to the invention, are provided. Each tool arm 80 includes a base 81, supported on the cross slide carriage 76, which mounts, by means of suitable cap screws 82, a deflectable or deformable tool mounting bar generally designated 83 and including an inner portion or section 83a which is secured to the base 81 and a movable outer portion or section 83b on which the tool is mounted. The tool arm, as noted, is of the general construction shown in U.S. Pat. No. 3,190,152 with the exception that mechanism is provided for controlling its deflection in accordance with tool wear. The bar 83 is thus similarly formed of a suitable "spring" steel, or other rigid and resilient material, and is provided at its front end with a pair of vertically extending openings 84 joined by a U-shaped slot 85 which substantially isolates the central portion or section 83a of the bar 83 from the tool supporting outer portion or section 83b. The portion 83b is connected to the portion 83a by the narrow deflectable portion 86 and so is capable of a limited movement relative thereto. To insure precise alignment of the bar 83 and the mounting bar 81, openings 81c are provided in the inner portion 83a for receiving dowel pins 83c which extend into the openings 81c in the mounting bar 81. The underside of the bar 83 may be recessed from end to end so that the clamping pressure exerted by the cap screws 82 is sufficient to preload the bar 83 vertically when it is assembled on the mounting bar 81. A top plate 87 for supporting the boring tool 78 is secured to the outer deflectable portions 83b by suitable cap screws (not shown). Suitable openings are also provided in the top plate 87 and bar 83 for receiving dowel pins to assure precise alignment.

The top plate 87 is grooved as at 88 so as to provide side wall portions 88b for snugly receiving the tool holder member 77. Provided in the underside of the top plate 87 is a transverse slot 91 to receive a hold-down bar 92 which is secured to the central bar portion 83a by suitable cap screws and extends across the sides of the U-shaped slot 85 to overlie the outer deflectable portions 83b and effectively hold the entire bar 83 against the mounting bar 81 without interfering with its flexing movement. To secure the tool holder 77 rigidly in the groove 88b, angularly disposed hold-down bolts (not shown) extend through angularly extending openings in the tool holder 77 and aligned openings 93 in the top plate 87.

Figures 5, 6:
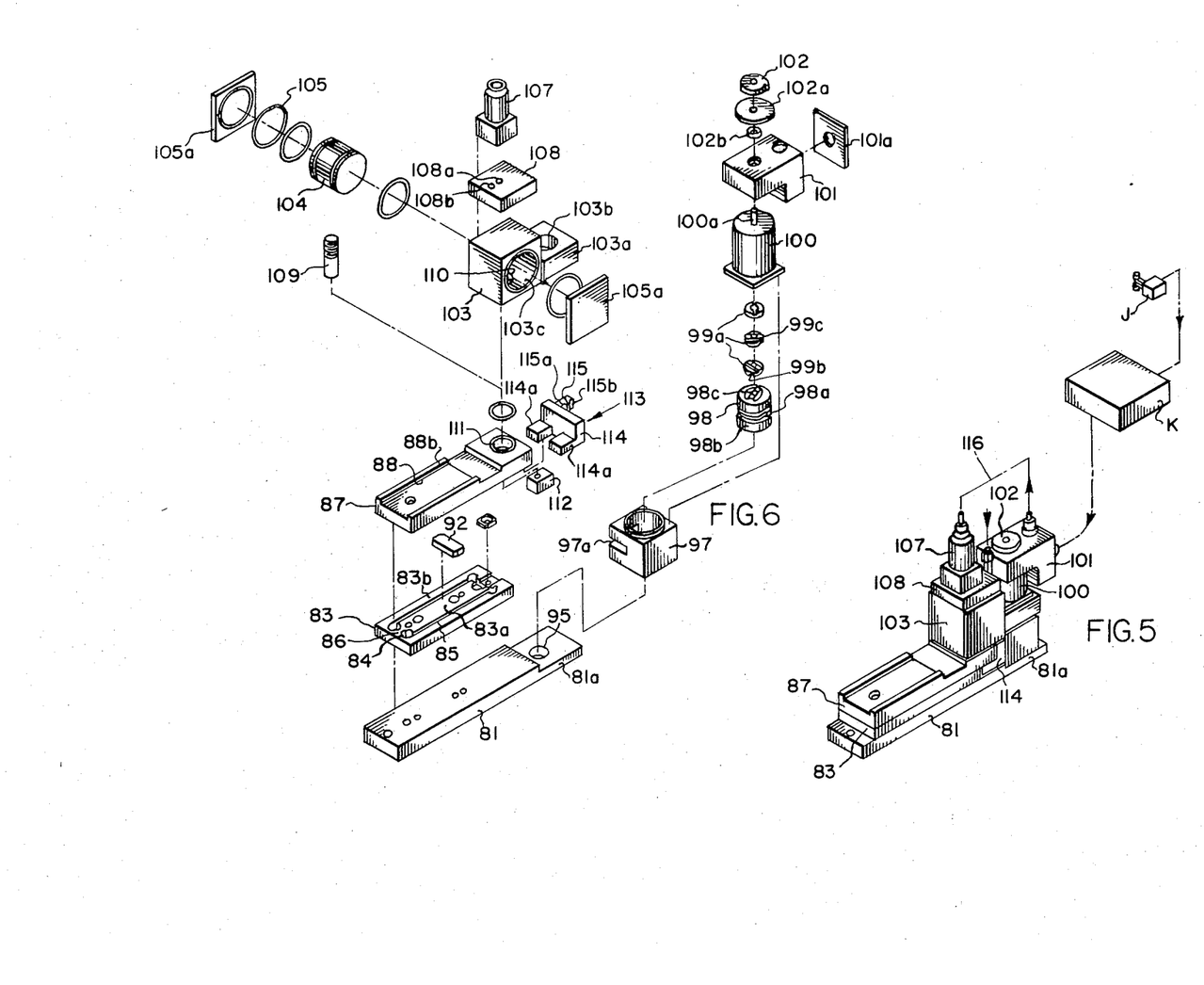
FIG. 5 is a perspective view slightly reduced in size, of a tool arm for adjustably mounting a machining tool such as a boring tool.
FIG. 6 is an exploded perspective view illustrating the various component parts of the tool arm shown in FIG. 5.

As FIGS. 5 and 7 indicate, one end of the mount bar 81 includes a portion 81a which is reduced in height and includes a through bore 95 for receiving the stub shaft portion 96 of a cam housing 97 that is secured to the portion 81a of the mount bar 81 in any suitable manner. Received within the cam housing 97 is a cam 98 having a follower engaging intermediate cam portion 98a and journal end portions 98b. Mounted atop the cam housing 97 is a horizontal extension 103a forming a part of a piston receiving cylinder housing 103. The extension 103a includes a through bore 103b receiving a Oldham type coupling member 99 for coupling the cam 98 with an alternating current, stepping motor 100 of the type manufactured by Superior Electronics, Bristol, Connecticut under Model No. H. S. 25 which is connected with a suitable source of alternating current such as 110 V, 60 cycle current. The motor may suitably be of a type which will provide 200 incremental steps for each 360° revolution.

The Oldham type coupling member 99 comprises a plurality of discs 99a having slots 99b receiving the complementally formed guide lugs 99c of each subadjacent disc 99a. The slot 99b of the lowermost disc 99a is drivingly engaged with the complementally formed drive lugs 98c on the cam roller 98.

As shown in FIGS. 5 and 6, a housing 101 is mounted atop the motor 100 and mounts a cam position indicator 102, which is fixed on an armature shaft extension 100a on the motor 100. The cam position indicator 102 is shaped identically to the follower engaging cam portion 98a and provides a visual indication of the rotary position of the cam 98. The housing 101 further includes a removable back plate 101a to permit access to the necessary terminals electrically connecting the motor 100 with the control apparatus K.

A bore 103c is provided in the housing 103 to function as a cylinder to slidably receive a piston 104 having annular grooves 104a for O-rings 105 which seal the ends of the piston 104. Also, cylinder heads 105a, are provided for the housing 103 and suitable sealing O-rings 106 are utilized between the heads 105a and cylinder 103. Atop the housing 103 is a manifold block 108 having a pair of air-direction ports 108a and 108b therethrough communicating with opposite sides of the piston 104. Atop the manifold block 108 is a conventional air valve 107 connected with a suitable source of air (not shown) and having solenoids 107a and 107b (FIG. 11) for selectively directing air under pressure through one of the ports 108a or 108b and exhausting it through the other. The control signals from the control unit K for the solenoids 107a and 107b are supplied via the connections schematically shown at 116.

A connecting pin 109 extends downwardly from the piston 104 through an elongated slot 110, in the bottom of the housing 103 to connect piston 104 with the plate 87 and the flexible portion 83b of bar 83. The pin 109 extends through a generally cylindrical bore 111 formed in the end of the top plate 87, and is connected to a portion of plate 87 which is slightly reduced in thickness as shown in FIG. 7. The lower end of the actuator pin 109 is fixed to this portion of the top plate 87 by a mounting block 112, which is fixed to the underside thereof by a cap screw 113a (FIG. 7) passing through the block 112 in the actuator pin 109. Bolted, or otherwise suitably secured to the end of the top plate 87 of the tool arm, is a cam follower, generally designated 113, having a cross-bar 114 with a pair of spaced apart mounting lugs 114a secured to the underside of the reduced cross section portion of the top plate 87. At its other side, the bar 114 has an extension 115 received within a slot 97a (FIG. 6) cut through the cam housing 97. The extension 115 is formed with a cam receiving curvilinear recess 115a (FIG. 8) for receiving a portion of the cam 98 and a follower protuberance 115b extending therefrom for engaging the cam surface 98a. As the cam 98 is rotated by the stepping motor 100, the position of the cam follower 113 is accordingly changed and the tool mounting top plate 87 which is connected thereto also moves as permitted by the flexbile bar 83b.

When a boring tool 78 has worn to the extent that the machined diameters are without the predetermined tolerance limits, as measured by the gauge apparatus J, the gauge apparatus J provides a voltage control signal which is proportional in magnitude to the difference between the predetermined diameter and the actual diameter measured by the gauge apparatus J. The polarity of the voltage control signal depends on whether the bores are overbored or underbored. The output of the gauge apparatus J is connected with the control apparatus K and is operative to provide a series of stepping pulses for driving the stepping motor 100 to circumferentially incrementally move the cam 98. Substantially simultaneously with, or slightly before, the motor 100 in circuit line 150 is driven, the solenoid 107a in circuit line 116 is energized so that air is directed to the right side of the cylinder 103 (as viewed in FIG. 9) to move the piston 104 in the direction of the arrow 117. The movement of the piston 104 is transmitted to the top plate 87 via the actuator pin 109, thereby moving the cam follower 115 out of engagement with the cam 98. When the piston 104 is moved in the direction of the arrow 117, it flexes the portion 83b of the bar 83 relative to the portion 83a a predetermined distance in excess of that required to correct for any expected wear of the tool member 78. The control apparatus K then actuates the control solenoid 107b so as to direct the air to the opposite side of the piston 104, as viewed in FIG. 9, and drive the piston 104 in the direction of the arrow 118, to cause the follower protrusion 115b to sharply impact the surface 98a. In this manner, the follower 115 is positively engaged with the cam 98 and the boring tool 78 is thus accurately positioned. In the machining of such workpieces, the permissible tolerances are very small, and thus the boring tool must be positioned with 10 thousandths of an inch. If the cam 98 were merely rotated without moving the cam follower 115 out of engagement therewith, the frictional forces between the protrusion 115 and the cam 98 would result in the boring tool being less accurately positioned. By withdrawing the member 115 out of engagement with the cam 98 and permitting it to impact the cam after the cam has been properly positioned, the boring tool 78 is also precisely positioned. Although the gauge apparatus J and control apparatus K have been described with reference to only one tool arm 80, it should be understood that the circuit is duplicated for two or more tool arms.

THE CONTROL CIRCUITS

Figure 11:
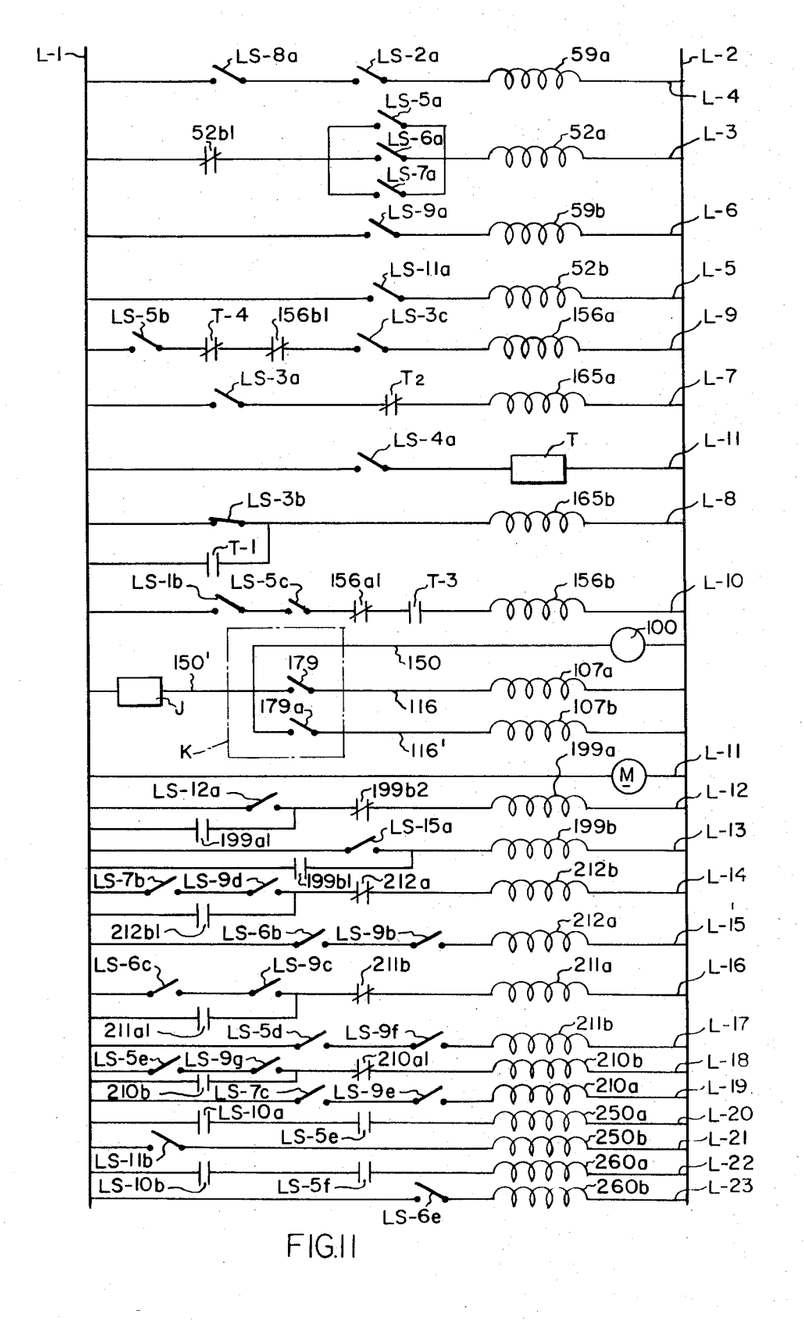
FIG. 11 is a schematic diagram illustrating a typical electrical control circuit which may be utilized to control the apparatus illustrated in FIGS. 1 - 10.

In describing the operation of the apparatus disclosed in FIGS. 1–9, reference will be particularly made to FIGS. 10 and 11. Referring firstly to the hydraulic control circuit shown in FIG. 10, fluid for the hydraulically operated cylinders 52 and 59 is supplied from a reservoir or other source 152 by a conventional pump 153, such as that made by Vickers Corporation as Model No. 2106-D-10, and which is driven by a suitable power source, such as an electric motor M. The fluid is pumped to a pair of two-way, three-position, solenoid operated directional valves 154 and 155. Valves 154 and 155 may suitably be of the type manufactured by Double A Products Company, Manchester, Michigan, as Model PQM-01-C-12A1. The solenoids 52a and 59a are utilized to move the spools (not shown) of the valves 154 and 155, respectively, to the "flow-through" position. With the valve 154 in the "flow-through" position, the piston 51 of the cylinder 52 will be moved so as to drive the shaft 27 and chucks D and H in the direction of the arrow j (FIG. 10) to the axially inward position shown in full lines in FIG. 3. With the valve 155 in the "flow-through" position, the piston of cylinder 59 is driven to move the rack 57 to the rack retract position in the direction of the arrow 1 to rotate the shaft 27a and index the carrier C. As shown in FIG. 11, a suitable source of power such as 110 volt, 60 cycle, alternating current is connected across the lines L-1 and L-2. The solenoid 52a in circuit line L-3 is energized when one of the limit switches LS-5, LS-6 or LS-7 is actuated to close the sets of parallelly connected, normally open, contacts LS-5a, LS-6a or LS-7a, respectively. When the limit switch LS-5 is actuated the normally open sets of contacts LS-5b and LS-5c in lines L-9 and L-10 respectively, are also closed. As also shown in FIG. 11, the solenoid 59a in circuit line L-4 is energized when the normally open contacts LS-8a of the limit switch LS-8 and the normally open contacts LS-2a of the limit switch LS-2 (FIG. 10) mounted adjacent the main slide 73 are closed.

A pair of solenoids 52b and 59b in circuit lines L-5 and L-6 respectively, are associated with the respective valves 154 and 155, respectively, and are utilized to move the spools of the valves 154 and 155, respectively, to the cross-over position. With the valves 154 in the cross-over position, the piston 51 of cylinder 52 will be moved in the direction of the arrow k (FIG. 10) to the axially outward position, as shown in solid lines in FIG. 10 and in chain lines in FIG. 2. With the valve 155 in the cross-over position, the piston of cylinder 59 will be moved in the direction of arrow m to the rack-extended position, as shown in FIG. 10. The solenoids 52b and 59b are energized when the normally open contacts LS-11a and LS-9a, respectively, of limit switches LS-11 and LS-9 (see FIG. 6) respectively are closed. A pilot-operated check valve 160 (FIG. 10) is hydraulically connected in circuit with the valve 155 and the cylinder 59 for the purpose of maintaining the fluid pressure in the cylinder 59 when the chucks D and H are in the axially outward position so that the rack 57 is prevented from rotating under the weight of the workpieces mounted on the chucks. The solenoid 52b, when energized, closes a set of normally closed contacts 52bl in line L-3.

To place the boring tool 78 in boring position, the main slide 73 is movable axially inwardly by a hydraulically operated cylinder, schematically shown at 156 in FIG. 10. Fluid for the cylinder 156 is supplied by the pump 153 through a pilot-operated valve 157 of the type manufactured by Double A Products Company under Model No. PQS-06-C-10A2. The valve 157 includes a pair of solenoids 156a and 156b which, when energized, are effective to move the spools of the valve 157 to the flow-through and cross-over positions, respectively, in addition to opening normally closed sets of contacts 156al and 156bl in lines L-10 and L-9, respectively. When the valve 157 is in the cross-over position, the piston of cylinder 156 is actuated to move the main slide 73 in the direction of the arrow k to the axially outer position, and when the valve 157 is in the flow-through position, the main slide 73 is moved inwardly in the direction of the arrow j. When the valve 157 is initially actuated to move the main slide 73 from the axially outward position to the axially inward position, the slide 73 initially moves very rapidly, but when the boring tools 78 approach the workpieces W in the work-piece holding chucks F, a cam 158 on the slide 73 depresses a plunger 159 mounted on a variable orifice feed control valve 160, connected between the valve 157 and the cylinder 156, so as to reduce the flow of fluid to the cylinder 156 to control the feed of the main slide 76 during the cuts of the workpieces by the boring tools 78. A valve, such as that manufactured by the Vickers Corporation as Model No. FCG-714-02-1000-11, has been found suitable for this purpose. As the main slide 73 reaches its axially innermost position, it engages a limit switch LS-3 to close and open the normally open and closed contacts LS-3a and LS-3b in circuit lines L-7 and L-8 respectively (FIG. 11).

For moving the cross slide 76 crosswisely on the main slide 73 in the ways 74, a hydraulically operated cylinder 165 is mounted on the main slide 73 and includes a piston 165' connected to the cross slide 76. Fluid for actuating the cylinder 165 is supplied by a pump 166, which is also driven by the motor M. Cylinder 165 is connected to a two-way, three-position, solenoid operated directional valve 167, which may be identical to the valves 154 and 155. The valve 167 includes a solenoid 165a for moving the spool of the valve 167 to the cross-over position. A limit switch LS-1 is mounted on the main slide 73 and is normally actuated by an actuator lug 73' to maintain the normally open contacts LS-1b in circuit line L-10 closed (see FIG. 11). Also mounted on the main slide 73 is a limit switch LS-4 having a set of normally open contacts LS-4a in circuit line L-11 (FIG. 11) which are closed when the cross slide 76 moves the chamfering tools 79 into engagement with the workpieces in the workpiece holding chucks F.

When the main slide 73 engages the limit switch LS-3 to close the contacts LS-3a in circuit line L-7, the solenoid 165a is energized via the normally closed contacts $T_2$ (to be later described more fully) to move the cross slide and the chamfering tools mounted thereon crosswisely on the main slide 73. The normally closed contacts LS-3b in circuit line L-8, which are connected in series with the solenoid 165b, simultaneously open to deenergize the solenoid 165b. When the solenoid 165a is actuated, the cross slide 76 is moved crosswisely on the main slide 73 so that the chamfering tools 79 chamfer the end portions of the bores whereas when the solenoid 165b is energized, the cross slide 76 is moved to the withdrawn position shown in FIG. 10. When the chamfering operation has been completed, the limit switch LS-4 is actuated to close the normally open contacts LS-4a in circuit line L-11 and energize a timer T connected in series therewith. The timer T includes sets of normally open contacts T-1 in parallel with LS-3b in circuit line L-8 and T-3 in circuit line L-10, which are closed when the timer T times out and sets of normally closed contacts T-2 and T-4 in circuit lines L-7 and L-9 respectively, which are opened when the timer T times out. When the contacts $T_1$ close, the solenoid 165b is energized to return the cross slide 76 to the position shown in FIG. 10, where it will again actuate the limit switch LS-1. When the timer contacts T-2 open the solenoid 165a is deenergized and when the contacts T-4 in circuit line L-9 open, the solenoid 156a is deenergized. The closing of the contacts T-3 permits the solenoid 156b to be energized when the limit switch LS-1 is again actuated by the cross slide 76 returning to the position shown in FIG. 10, to close the contacts LS-1a. When the solenoid 156b is energized, the piston 156 moves the main slide 73 in the direction of the arrow k to the axially outermost position. After the parts have been machined and roll down the discharge chute I into the gauge station, the parts actuate a limit switch LS-12 including a set of normally open contacts LS-12a connected in series with the advance solenoid 199a of a fluid operated, solenoid controlled cylinder 199 (FIG. 2), which is operable to move the guage head J into position where it will gauge the bores W''. When the fingers f of the gauge head expand to measure the part, this information is compared with the desired bore and a error signal, proportional to the error, is sent to the control apparatus K along the line 150' (FIG. 11). The control apparatus K is operative to provide a series of stepping pulses, the number of which is proportional to the error signal, to the stepping motor 100 via the line 150. A switch 179 in the control unit K is closed simultaneously with, or slightly before, the transmission of the stepping pulses to the motor 100 to energize the solenoid 107a to direct air to the right side of the cylinder 104 (as viewed in FIG. 9) in the direction of the arrow 117 and withdraw cam follower 115. When the motor 100 has stepped the cam 98, as required, the switch 179 is opened and a switch 179a is closed to energize the return solenoid 107b so that fluid is sent to the opposite side of the cylinder 104 and returns the cam follower 115 into engagement with the cam 98.

The gauged part is then released to actuate a limit switch LS-15 and close a set of normally open contacts LS-15a connected in series with the retract solenoid 199b of cylinder 199 which is operable to return the gauge head J to its original position. Another ungauged part then enters the gauge station and the measuring cycle is repeated. The solenoids 199a and 199b are operable to close sets of normally open holding contacts 199a1 and 199b1 connected in parallel with the limit switch contacts LS-12a and LS-15a respectively. The solenoid 199b when energized, is also operable to open a set of normally open contacts connected in line L-12. If desired, a pivotal stop (not shown), which may be formed identical to the stop 17, may be provided in the discharge chute I for releasing the gauged part and preventing ungauged parts from entering the gauge station.

The pneumatic control circuit for the chucks D, F and H is shown in FIG. 10a and includes a suitable source of pneumatic air PS connected with the chucks F, D and H with three, two-way, two-position, solenoid controlled, pneumatic valves 212, 210, and 211 respectively. A Mac air valve, Model No. 343-C has been found suitable for this purpose. The chucks F, D and H may be of the type which are spring-biased to the chucking position if desired.

Referring now to FIG. 11, the solenoid for moving the valve 212 so as to direct air to the chucks F in such a manner that the chucks F release and hold workpieces therein are shown at 212a (line L-15) and 212b (line L-14) respectively. When energized, the solenoids 212a and 212b are operative to respectively open a set of normally closed contacts 212a1 and close a set of normally open contacts 212b1. The solenoid 212b is connected in series circuit relation with the normally closed contacts 212a1 and the normally open contacts LS-7b and LS-9d which are closed when the limit switches LS-7 and LS-9 are actuated respectively. The solenoid 212a is connected in line L-15 with the normally open limit switch contacts LS-6b and LS-9b which are closed when the limit switches LS-6 and LS-9 are actuated respectively. The solenoid contacts 212b1 are connected in parallel with the limit switch contacts LS-7b and LS-(d.

The solenoids for moving the valve 211 so as to move the chucks H between a chucking position and an unchucking position are shown at 211a and 211b respectively. The solenoids 211a and 211b, when energized, are respectively operable to close a set of normally open contacts 211a1 and open a set of normally closed contacts 211b1. The solenoid 211a is connected in series, in line L-16, with the normally closed contacts 211b1 and the normally open contacts LS-6c and LS-9c which are closed when the limit switches LS-6 and LS-9 are actuated respectively. The contacts 211a1 are connected in parallel circuit with the limit switch contacts LS-6c and LS-9c. The solenoid 211b is connected, in line L-17, in series circuit relation with the normally open limit switch contacts LS-5d and LS-9f which are closed when the limit switches LS-5 and LS-9 are actuated respectively.

The solenoids for actuating the valves 210, to move in a direction so as to direct air to the chucks D and move the chucks between a workpiece releasing and a workpiece holding position, are shown at 210a and 210b respectively. The solenoids, 210a and 210b, when energized, are respectively operable to open a set of normally closed contacts 210a1 and close a set of normally open contacts 210b1. The solenoid 210b is connected in line L-18 in series circuit relation with the normally open contacts LS-5e and LS-9g which are closed when the limit switches LS-5 and LS-9 are actuated respectively. The set of normally open contacts 210b1 are connected in parallel with the normally open limit switch contacts LS-5d and LS-9g. The solenoid 210a is connected, in line L-19, in series with the normally open limit switch contacts LS-7c and LS-9e which are open when the limit switches LS-7 and LS-9 are actuated respectively. The exit gate opening and closing control circuits are illustrated in circuit lines L-20 and L-21 and the entrance gate opening and closing control circuits are illustrated in circuit lines L-20 and L-23. The limit switch LS-5 includes normally open contacts LS-5e and LS-5f, connected in lines L-20 and L-22, which are closed when the limit switch LS-5 is actuated. The limit switch LS-10 includes sets of normally open contacts LS-10a and LS-10b, in lines L-20 and L-22 respectively, which are closed when the rack 57 is moved to the extended position. The advance windings 250a and 260a for driving the reversible motor R for opening the exit gate M' and entrance gate M are connected in lines L-20 and L-22. The reversing windings for driving the ROTAC motor R in the opposite direction for closing the exit and entrance gates M' and M are illustrated at 250b and 260b respectively in lines L-21 and L-23. The winding 260b is connected in series with a set of contacts LS-6c which close when the limit switch LS-6 is actuated in response to the entering of the shaft 27.

THE OPERATION

The operation of the apparatus will be described particularly with reference to FIGS. 10, 11, and 12A-12D. It will be assumed that the indexing apparatus C is initially in the position shown in FIG. 12A and the main slide 73 and the shaft 27 are in the axially outer position (as shown in FIG. 10). It will further be assumed that the chucks D have a pair of unmachined rings W secured therein, while the chucks H are empty, and a pair of machined rings r are chucked at the machining station chucks F. With the main slide 73 being in the axially outward position to actuate limit switch LS-2 and the shaft 27 being in the axially outward position to energize the limit switch LS-8, the normally open contacts LS-2a and LS-8a in circuit line L-4 are closed to actuate the solenoid 59a to cause fluid to be directed to the cylinder 59 so as to move the rack 57 to the retracted position, thereby indexing the loader counterclockwise from the position shown in FIG. 12A to the position shown in FIG. 12B. When the loader moves to the position shown in FIG. 12B, the limit switch LS-6 is actuated to close the normally open contacts LS-6a in circuit line L-3 and energize the solenoid 52a which directs fluid to the cylinder 52 so as to retract the shaft 27 axially inwardly until the actuator 53 actuates the limit switch LS-9 to close the normally open contacts LS-9a in circuit line L-6. This completes the circuit to the solenoid 59b, causing fluid to be directed to the cylinder 59 so as to move the rack 57, now positioned in the reduced portion 29, in the direction of the arrow m to the rack extend position. When the shaft 27 is in the axially inward position and the normally open contacts LS-6b and LS-9b are closed as the limit switches LS-6 and LS-9 are actuated, the chucks F release the machined workpieces r when the solenoid 212a, in line L-15, is energized. Substantially simultaneously, the contacts LS-6c and LS-9c close and the chucks H pick up the machined workpieces when the solenoid 211a in line LS-16 is energized, while the chucks D merely hold the previously mentioned unmachined workpieces w. When the rack 57 reaches the rack extended position, the limit switch LS-11 is again actuated to close the normally open contacts LS-11a in circuit line L-5, to energize the solenoid 52b which causes fluid to be directed to the cylinder 52 so as to move the shaft 27 and carrier C to the axially outer position. The limit switch LS-8 is again actuated when the carrier C reaches the axially outer position to energize the solenoid 59a, in circuit line L-4, which causes fluid to be directed to the rack actuating cylinder 59 so as to again move the rack 57 to the rack retracted position and index the carrier C from the position shown in FIG. 12B to the position shown in FIG. 12C. With the carrier C in the position shown in FIG. 12C, the limit switch LS-7 is actuated by the cam 43 to close the normally open contacts LS-7a in circuit line L-3, to energize the solenoid 52a to again cause fluid to be directed to the cylinder 52 so as to move the shaft 27 and carrier C axially inwardly. When the carrier C is in the axially inner position, the limit switch contacts LS-7c and LS-9e are closed in circuit line L-19 to energize the solenoid 210a so that the chucks D release the unmachined workpieces u to the workpiece holding chucks F which are actuated when the limit switch contacts LS-7b and LS-9d are closed in circuit line LS-14 to energize the solenoid 212b to grip the workpieces u while the chucks H merely continue to hold the previously chucked machined work-pieces r therein. The spindle motors (not shown) rotate the chuck H when workpieces are gripped therein. The rack 57 is then again retracted with the actuation of the limit switch LS-9 and the shaft 27 is again moved to the axially outer position where it can be indexed from the position shown in FIG. 12C to the position shown in FIG. 12D in the manner previously explained.

When the carrier C is indexed to the position shown in FIG. 12D, the limit switch LS-10 is actuated to close the contacts LS-10a and LS-10b in lines L-20 and L-22. Also the limit switch LS-5 is actuated to close the contacts LS-5e and LS-5f in lines L-20 and L-22 to energize the advance windings 250a and 260a of the motors R which operate to open the exit gates M' and entrance gates M respectively. Also, the normally open contacts LS-5a close to energize the solenoid 52a to again cause fluid to be directed to the cylinder 52 so as to move the shaft 27 inwardly. When the chucks D and H reach the axially inner position, the chucks H are actuated, when the limit switch contacts LS-5d and LS-9f in circuit line L-17, are closed to energize the solenoid 211b to release the machined workpieces r to the discharge chute I and the chucks D are actuated when the limit switch contacts LS-5d and LS-9g in line L-18 close to energize the solenoid 210b, and pick up new unmachined workpieces u at the load station B. When the chucks D and H are in the axially inner position the limit switch contacts LS-9a are closed to actuate the solenoid 59b to move the rack 57 to the extended position. With the rack in the extended position, the contacts LS-11b close to energize the winding 250b in line L-21 which closes the exit gates M' so that as the chucks H are withdrawn from the chutes I, the machined workpieces W are stripped from the chucks H.

Simultaneously with the movement of the shaft 27 inwardly, the closure of contacts LS-5b in line L-9 energizes the solenoid 156a which directs fluid to the cylinder 156 so as to move the main slide 73 inwardly. Initially the main slide moves in very rapidly until the cam 158 engages and depresses the plunger 159, after which time the hydraulic fluid is channeled through a variable orifice 0 in valve 160 to reduce the feed speed during the boring portion of the cycle when the boring tools 78 are boring the openings W' of the workpieces W. The main slide 73 continues to move axially inwardly until the boring tools 78 have nearly completely bored the openings W'. Just prior to completion of the boring operation, however, the limit switch LS-3 is actuated to open the contacts LS-3c in circuit line L-9 to deenergize the solenoid 156a so that shoulders 190 (FIG. 2A) remain adjacent the inner ends of the workpieces W. The closing of the contacts LS-3a in circuit L-7 actuates the solenoid 165a to cause fluid to be directed to the cylinder 165 to move the cross slide 76 and the chamfering bits 79 radially into engagement with the diametrically opposite sides of the bores W' to remove the shoulders 190 and form chamfers 191 at opposite ends of the workpieces W, as shown in FIG. 2B. When the chamfering operation has been completed, the limit switch LS-4 is actuated to close the contacts LS-4a in circuit line L-11 to start the timer T, and when the timer times out (e.g. one-half second) the cross slide 76 is returned to the position shown in FIG. 10, at which time the main slide 73 is moved outwardly to return it to its initial retracted position. When the shaft 27 is indexed to the succeeding position to close the contacts LS-6e in line L-23, the entrance gates M will close to prevent the rings w from falling out of the entrance chutes A. When the main slide 73 returns to the axially outer position, the limit switch LS-2 is actuated and the cycle is again repeated.

ALTERNATE EMBODIMENT

Figures 13, 14:
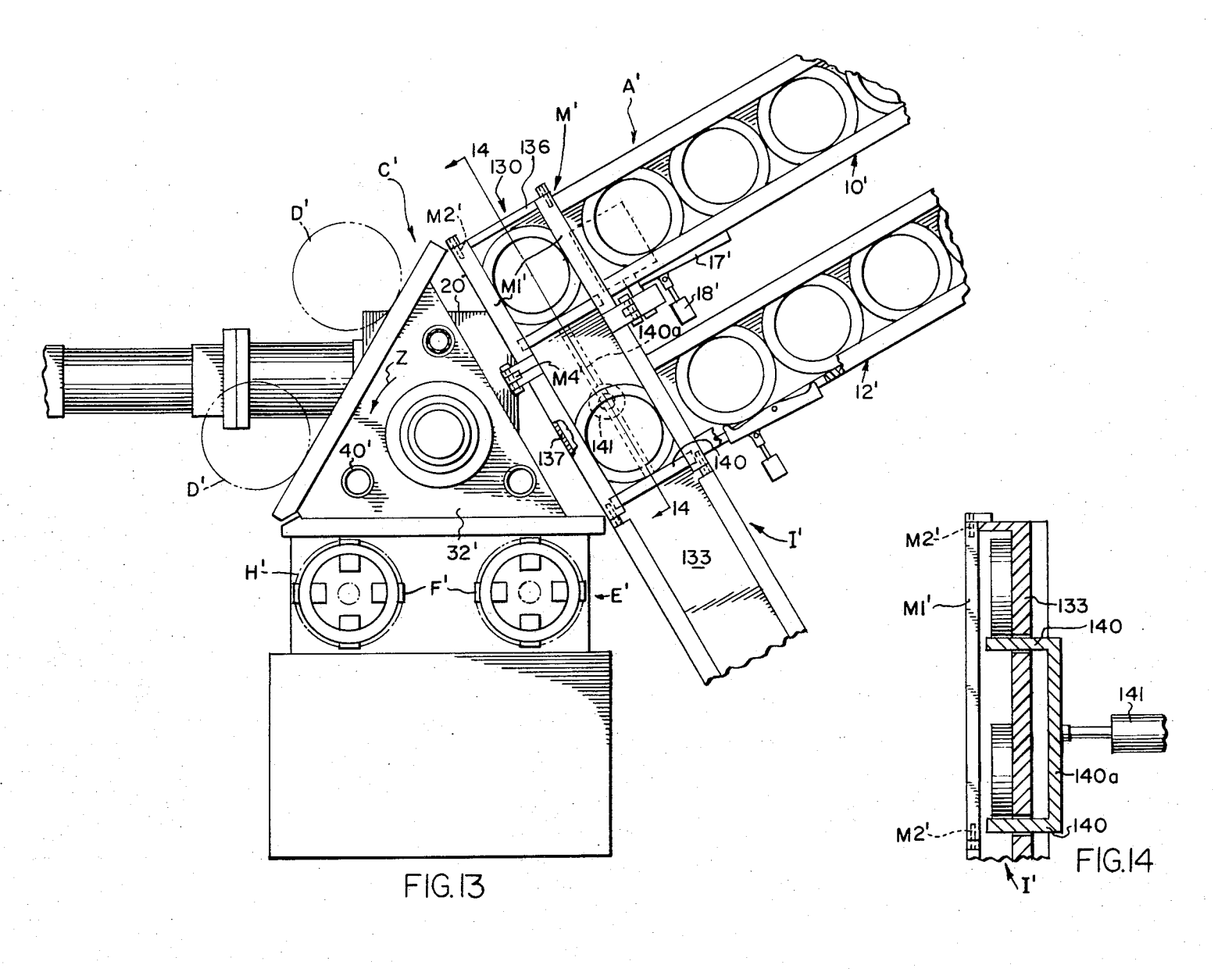
FIG. 13 is a partly schematic, fragmentary, front elevational view of an alternate embodiment of the invention, parts being broken away to more clearly illustrate certain portions thereof.
FIG. 14 is a transverse sectional, view taken along the line 14 — 14 of FIG. 13.

Referring now more particularly to FIGS. 13 and 14, an alternate embodiment of the invention is illustrated wherein the workpieces W are both delivered to, and discharged from, one and the same side of the indexible machine tool loading and unloading carrier C'. The apparatus disclosed in FIGS. 13 and 14 is substantially identical to that disclosed in FIGS. 1 – 9, with the exception of the loading chutes A' and discharge chutes I', and corresponding parts will be identified with corresponding numerals and characters, followed with a prime designation. It will be noted that the lower portion of discharge chute I' is now disposed adjacent and beneath the supply chutes A'. The supply chutes A' and discharge chute I' also now incorporate a common chute section 130 which includes a vertically inclined rear wall portion 133, an outer end wall 137, and front hinge bars M1' which are pivotally mounted on pivot pins M2' for receiving the chucks D' which pick up and remove unmachined workpieces received from the supply chutes A'. The chucks H', which deliver machined work-pieces to the discharge chute I', also pass between hinge bars M2' in the open position. To prevent the unmachined workpieces W from passing downwardly through the discharge chute I', a pair of stops 140, which pass through the rear wall 133 and are joined by member 140a, may be connected with the piston of a double-acting, solenoid controlled, fluid pressure operated cylinder 141. When the stops 140 are in the position shown in FIG. 14, they will prevent the unmachined workpieces W from moving downwardly through the discharge chute I'. When the piston of the cylinder 141 is retracted, machined work-pieces W which have been deposited in chute section 130, can drop through the chute section 130 and the discharge chute I'.

The operation of the embodiment illustrated in FIGS. 13 and 14 is accomplished with a circuit similar to that disclosed in FIG. 11, but operating in a slightly different sequence. Thus, a separate circuit for this embodiment will not be separately described. Generally, however, unmachined workpieces W pass through the chutes A' into the chute portion 130 where the workpieces W are vertically supported on the stops 140. In FIG. 13, with the shaft 27 in the axially outer position, the chucks D' carry unmachined workpieces, which they have previously picked up from the chute 130. Then the carrier C' is moved axially inwardly, so that the chucks H' will pick up already machined parts from the machining station chucks F', after which the carrier C' is moved axially outwardly. The apparatus C' will then be indexed one step counterclockwisely in the direction of the arrow Z. Following this, the carrier C' will then be again moved axially inwardly and the chucks H' will deposit the machined parts in the chute section 130 while the chucks D' are substantially simultaneously depositing unmachined workpieces in the emptied chucks F'. Before the chucks H' release the machined workpieces, the cylinder 141 is actuated to move the stops 140 out of the path of the workpieces to permit the workpieces to pass downwardly through discharge chute I'. The chucks H' are then actuated to release the machined workpieces after which the apparatus C' is moved axially outwardly and again indexed one step. After the indexible apparatus C' moves axially to its outermost position, the cylinder 141 will again be actuated to move the stops 140 into the position shown in FIG. 13, and the cylinders associated with the stops 17' will be energized to permit the next pair of workpieces W to pass downwardly into the chute portion 130, and then returned to the position shown in FIG. 13 to block the passage of any further workpieces. The apparatus C' is then moved axially inwardly to move the chucks H' and D' axially inwardly so that the chucks D' will pick up unmachined workpieces. Simultaneously, the carriage of the machine assembly G' will move axially inwardly so that the boring and chamfering tools will machine the workpieces at station E' as described hereinbefore. During the machining operation, the apparatus C' is again moved axially inwardly and, after the machining operation, outwardly where it is indexed to the position shown in FIG. 13. The carrier C' and the chucks H' are then moved inwardly to pick up another set of machined workpieces and the cycle will be repeated.

It should be further understood that the workpieces W can be forged or cast in the shape of a disc and that the apparatus can perform machining operations such as turning, facing and grooving. One or more spindles within the capacity of the machine can be accommodated.

It should further be understood that although the apparatus has been described as being hydraulically operated, the apparatus could be pneumatically operated or operated by a cam or lead screw.

It is to be understood that the drawings and descriptive matter are in all cases to be interpreted as merely illustrative of the principles of the invention, rather than limiting the same in any way, since it is contemplated that various changes may be made in various elements to achieve like results without departing from the spirit of the invention or the scope of the appended claims.

I claim:
1. A tool arm comprising:
   support means;
   flexible bar means mounted on said support means and having a yieldable deformable portion;
   tool holding means on said flexible bar means; and
   means for selectively deforming said deformable portion including:
   removably engageable, relatively rotatable cooperating cam means and cam follower means included on said support means and tool holding means and being yieldably held in engagement by said yieldable portion of said flexible bar means;
   means for relatively rotating said cam means and cam follower means; and
   means for moving said cam means and cam follower means out of engagement when said cam means and cam follower means are relatively rotated and permitting said cam and cam follower means to impact when said cam means and cam follower means are not being relatively rotated.

2. A tool arm as set forth in claim 1 wherein said moving means includes cooperating cylinder and piston means connected between said support means and said tool holding means.

3. A tool arm as set forth in claim 2 wherein said cylinder is connected with said support means and includes an aperture in its side wall; said piston including a portion movably received within said aperture and being connected with said tool holding means.

4. A tool arm as set forth in claim 1 wherein said means for relatively rotating said cam and cam follower means comprises intermittently operable motor means; and means for intermittently operating said motor means to relatively index said cam means and cam follower means.

5. A tool arm as set forth in claim 4 wherein said cam follower means is mounted on said tool holding means and said cam is mounted on said support means and connected with said motor means.

6. A tool arm comprising:
   support means;
   flexible bar means mounted on said support means and having a yieldable deformable portion;
   tool holding means on said deformable portion;
   adjustable tool positioning means, reactable between said support means and said deformable portion and movable to a plurality of adjusted control positions, for selectively deforming said deformable portion and positioning said tool holding means; and
   means for separating said deformable portion and said tool positioning means when said tool positioning means is being adjusted and then permitting said deformable portion and said position control means to move together so that said tool means is precisely positioned.

7. The arm set forth in claim 6 wherein said adjustable position control means comprises cam means movably mounted on said support means, and cam follower means is provided on said flexible bar means yieldably held in engagement with said cam means by said deformable portion of said flexible bar means, and means mounts one of said cam means and said cam follower means for rotation relative to the other.

8. A tool arm structure comprising:
   support means;
   a movable tool holder support portion mounted on said support means;
   tool holding means mounted to move with said movable portion;
   adjustable tool positioning means mounted to react with said movable portion and movable to a plurality of adjusted control positions, for selectively moving said portion and positioning said tool holding means;
   power driven motor means for moving said adjustable tool positioning means; and
   means for automatically separating said movable portion and said tool positioning means at the time said tool positioning means is adjusted and then positively reengaging said movable portion and said tool positioning means once said tool positioning means is precisely positioned.

9. The tool arm structure set forth in claim 8 wherein said adjustable tool positioning means comprises a rotary cam, said motor means comprises a stepping motor which revolves said cam in increments of a revolution; and said movable portion includes a follower engaging said cam.

10. A tool arm structure comprising:
    front to rear extending support means;
    longitudinally extending tool bar means mounted on said support means and having a laterally movable portion;
    tool holding means mounted to move laterally with said portion;
    rotatable cam means, including a pair of lands and a cam surface of reduced diameter between said lands;
    a cam housing, having an internal bore surface for receiving said cam means and a wall portion with a slot therein, mounted by said support means; said lands operating with the bore surface to shield the cam surface from tool chips;
    a cam follower arm connected with said movable portion to extend through said slot to a position laterally alongside said cam surface to laterally engage it; and
    means for incrementally rotating said cam means so that said cam follower means engages different portions of said cam surface when said cam means is rotated and positions said movable portion and tool holder accordingly.

* * * * *

UNITED STATES PATENT OFFICE
CERTIFICATE OF CORRECTION

Patent No. 3,812,747            Dated May 28, 1974

Inventor(s) Carl H. Werth

It is certified that error appears in the above-identified patent and that said Letters Patent are hereby corrected as shown below:

Column 12, line 35, change "LS-(d" to -- LS-9d --.

Claim 7, line 2, change "position control to -- tool positioning --.

Signed and sealed this 22nd day of October 1974.

(SEAL)
Attest:

McCOY M. GIBSON JR.
Attesting Officer

C. MARSHALL DANN
Commissioner of Patents